(12) United States Patent
Davis et al.

(10) Patent No.: US 6,801,016 B2
(45) Date of Patent: Oct. 5, 2004

(54) MATCHING CELLS FOR A BATTERY PACK (75) Inventors: Steven Davis, Batavia, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 34 days.

(21) Appl. No.: 10/324,762

(22) Filed: Dec. 20, 2002

(65) Prior Publication Data

US 2003/0117105 A1 Jun. 26, 2003

Related U.S. Application Data (60) Provisional application No. 60/344,944, filed on Dec. 21, 2001.

(51) Int. Cl.[7] .................................................. H02J 7/00
(52) U.S. Cl. ...................................................... 320/132
(58) Field of Search .......................... 320/132; 607/57; 429/300, 305; 324/425, 426, 427, 430, 434

(56) References Cited

U.S. PATENT DOCUMENTS

| | | | |
|---|---|---|---|
| 5,504,415 A | 4/1996 | Podrazhansky et al. | 320/118 |
| 5,519,563 A | 5/1996 | Higashijima et al. | 361/16 |
| 5,530,336 A | 6/1996 | Eguchi et al. | 320/118 |
| 5,644,209 A | 7/1997 | Chabbert et al. | 320/122 |
| 5,650,712 A | 7/1997 | Kawai et al. | 324/427 |
| 5,736,835 A | 4/1998 | Nakajo et al. | 320/112 |
| 5,739,671 A | 4/1998 | Hamada | 320/149 |
| 5,886,502 A | 3/1999 | Higashijima | 320/118 |
| 5,936,383 A | 8/1999 | Ng et al. | 320/132 |
| 5,998,967 A | 12/1999 | Umeki et al. | 320/127 |
| 6,023,150 A | 2/2000 | Patino et al. | 320/132 |
| 6,043,629 A | 3/2000 | Ashley et al. | 320/119 |
| 6,280,883 B1 * | 8/2001 | Lamanna et al. | 429/307 |

FOREIGN PATENT DOCUMENTS

WO  WO 01/22107 A1  3/2001

* cited by examiner

Primary Examiner—Pia Tibbits
(74) Attorney, Agent, or Firm—Michael F. Scalise (57) ABSTRACT

A battery pack having a first secondary cell and a second secondary cell, preferably of a non-aqueous chemistry, is described. Each secondary cell has a discharge capacity and an internal resistance to a direct charge current. To diminish and alleviate problems associated with extended cycling of battery packs, the internal resistance to the direct charge current and the discharge capacity of each secondary cell is substantially matched. Thereby, the battery packs have longer running voltages and increased energy density.

22 Claims, 4 Drawing Sheets

MATCHING CELLS FOR A BATTERY PACK

CROSS REFERENCE TO RELATED APPLICATION

This application claims priority based on provisional application Serial No. 60/344,944, filed Dec. 21, 2001.

FIELD OF THE INVENTION

The field of this invention relates to selecting cells for assembly into lithium-ion battery packs.

BACKGROUND OF THE INVENTION

Lithium ion secondary cells have been incorporated in numerous portable electronic devices, e.g., cellular phones, laptop computers, and video recorders, because lithium ion secondary cells provide superior running voltage and increased energy density. Due to these outstanding characteristics, lithium-ion secondary cells are also being incorporated into medical applications.

When lithium-ion secondary cells are used, they are normally configured in parallel/series combination to provide the required running time and power needed to operate the associated device. The problem is that when lithium-ion cells are cycled outside of a carefully controlled voltage range, they can experience safety problems. To diminish these problems, a voltage supervisor is used to monitor cell voltages within a pack of lithium cells, and to interrupt current into or out of the pack should the voltage on any one cell exceed or fall below preset voltage limits.

Even within a safe operating voltage range, differences in performance of individual lithium-ion cells are observed at different voltage limits. To resolve this problem, others have developed circuitry to artificially balance cells within a battery pack. Such alternative embodiments are disclosed in U.S. Pat. Nos. 5,519,563 to Higashijima et al., 5,530,336 to Eguchi et al., 5,504,415 to Podrazhansky et al., 5,886,502 to Higashijima and 5,998,967 to Umeki et al. These patents balance the circuitries by bringing the voltages of different batteries within the pack to the same terminal voltage at the end of the charge.

When a lithium ion battery is charged, it is first charged at constant current, and then at constant voltage. Under constant current charge, the cell is charged at a set current proportional to the related capacity of the cell until a desired voltage is achieved. If multiple cells in series are being charged, the entire series stack is charged at a constant current until a desired constant voltage, equal to the number of cells in the stack multiplied by the desired single cell voltage, is achieved. The cell or series stack is then held at constant voltage until the charge current decays to a preset lower limit.

During the charge of multiple lithium cells in series, the same current must pass through all cell elements. If one of the series cell elements is more resistive than the others, it will generate a higher internal voltage on charge, and surpass the desired terminal voltage limit sooner than the less resistive cells. When the entire series string passes into constant voltage charging mode, the cell will be at a higher voltage than the other cell elements in the string. The other series cell elements will be at a lower voltage. The reversible capacity of the higher voltage cell will degrade due to exposure to this higher voltage. If no cell balancing is employed and as the internal resistance of all the cells increases with cycling, the higher voltage cell or cells may eventually exceed the supervisory over voltage limit, shutting down the pack before it is fully charged. Furthermore, the more resistive cell will experience a greater voltage drop on discharge. Again, if no cell balancing is employed, this cell may eventually fall below the preset supervisory under voltage limit, shutting down the pack before the less resistive cells are fully discharged.

SUMMARY OF THE INVENTION

The present invention relates to a battery pack having at least a first non-aqueous secondary cell and a second non-aqueous secondary cell. Each non-aqueous secondary cell has a discharge capacity and an internal resistance to direct charge current. To diminish and alleviate problems associated with conventional battery packs, the present invention has the internal resistance to direct charge current and the discharge capacity of each non-aqueous secondary cell substantially matched to each other. Thereby, the battery packs have longer running voltage and increased energy capacity after cycling.

DETAILED DESCRIPTION OF THE PREFERRED EMBODIMENTS

As used herein, the term "pulse" means a short burst of electrical current of significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10-second pulses (4 $mA/cm^2$) with a 15 second rest between each pulse. A typically used range of current densities for cells powering implantable medical devices is from about 0.5 $mA/cm^2$ to about 10 $mA/cm^2$, and more preferably from about 3 $mA/cm^2$ to about 7 $mA/cm^2$. However, it could be significantly shorter or longer depending on the specific cell design and chemistry. A pulse train can also be used to charge the secondary cell with the current densities being similar to the discharge regime.

The electrochemical cell of the present invention is of a secondary, rechargeable chemistry. The cell comprises an anode active metal selected from Groups IA, IIA and IIIB of the Periodic Table of the Elements, including lithium, sodium, potassium, etc.

In conventional secondary electrochemical systems, the anode or negative electrode comprises an anode material capable of intercalating and de-intercalating the anode active material, such as the preferred alkali metal lithium. Typically, the anode material of the negative electrode comprises any of the various forms of carbon (e.g., coke, graphite, acetylene black, carbon black, glassy carbon, etc.) that are capable of reversibly retaining the lithium species. Graphite is particularly preferred in conventional secondary cells. "Hairy carbon" is another particularly preferred conventional material due to its relatively high lithium-retention capacity. "Hairy carbon" is a material described in U.S. Pat. No. 5,443,928 to Takeuchi et al., which is assigned to the assignee of the present invention and incorporated herein by reference.

Regardless of the carbonaceous nature or makeup of the anode material, fibers are particularly advantageous. Fibers have excellent mechanical properties that permit them to be fabricated into rigid electrode structures capable of withstanding degradation during repeated charge/discharge cycling. Moreover, the high surface area of carbon fibers allows for rapid charge/discharge rates.

The negative electrode for a secondary cell is fabricated by mixing about 90 to 97 weight percent of the carbonaceous anode material with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector selected from copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloys. The current collector is a foil or screen and contact is by casting, pressing, or rolling the admixture thereto.

The cathode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCu_{0.92}Sn_{0.08}O_2$ and $LiCo_{1-x}Ni_xO_2$.

As is the case with the above described carbonaceous anode materials, the cathode materials are formed into an electrode body for incorporation into an electrochemical cell by mixing one or more of them with one of the above described binder materials. Further, up to about 10 weight percent of a conductive diluent is preferably added to the mixture to improve conductivity. Suitable materials for this purpose include acetylene black, carbon black and/or graphite or a metallic powder such as powdered nickel, aluminum, titanium and stainless steel. The preferred cathode material mixture thus includes a powdered fluoro-polymer binder present at about 1 to 5 weight percent, a conductive diluent present at about 1 to 5 weight percent and about 90 to 98 weight percent of the cathode active material.

To charge such secondary cells, the lithium ions comprising the positive electrode are intercalated into the anode material by applying an externally generated electrical potential to the cell. The applied recharging potential draws the lithium ions from the cathode active material, through the electrolyte and into the anode material to saturate it. In the case of a carbonaceous anode material, the resulting $Li_xC_6$ material has an x ranging from about 0.1 to about 1.0. The cell is then provided with an electrical potential and discharged in a normal manner.

Rolling, spreading or pressing the cathode active formulations onto a suitable current collector of any one of the previously described materials suitable for the negative electrode may prepare positive electrodes. The preferred cathode electrode current collector material is a perforated aluminum foil or screen, such as an expanded aluminum screen.

In order to prevent internal short circuit conditions, the negative electrode is separated from the positive electrode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell further includes a nonaqueous, ionically conductive electrolyte that serves as a medium for migration of ions between the negative and positive electrodes during electrochemical reactions of the cell. A suitable electrolyte has an inorganic, ionically conductive salt dissolved in a nonaqueous solvent, and more preferably, an ionizable alkali metal salt dissolved in a mixture of aprotic organic solvents comprising a low viscosity solvent and a high permittivity solvent. Preferably, the ion forming alkali metal salt is similar to the alkali metal comprising the anode active material. In the case of lithium, known salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate (EMC), methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

A preferred electrolyte for a secondary cell comprises a solvent mixture of EC:DMC:EMC:DEC. Most preferred volume percent ranges for the various carbonate solvents include EC in the range of about 10% to about 50%; DMC in the range of about 5% to about 75%; EMC in the range of about 5% to about 50%; and DEC in the range of about 3% to about 45%. In a preferred form of the present invention, the electrolyte activating the cell is at an equilibrated molar mixture with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 10/232,166, filed Aug. 30, 2002, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The assembly of the secondary cells is in the form of one or more cathode plates operatively associated with one or more plates of a negative electrode. Alternatively, the negative electrode and positive electrode, both in strip form, are provided with an intermediate separator and wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred. However, the secondary electrochemical systems can also be constructed in case-positive configuration.

The present invention is directed to matching at least two secondary cells for assembly into battery packs. The cells are preferably of a non-aqueous chemistry. The matching of cells is predicated not only on the basis of observed discharge capacity, but also on the basis of internal resistance to a direct charging current. Specifically, the internal resistance to the direct charging current is measured at a full state of charge. Furthermore, if the cells are to be used in an implantable medical application, this internal resistance measurement is preferably taken at about 37° C.

Internal resistance is calculated using Ohms law (resistance=voltage/current) as a change in voltage divided by the corresponding change in current. The change in voltage is preferably observed by either pulse discharging the cells, pulse charging the cells, or removing a charge current from the cells and measuring the differential voltage. The change in current is then calculated as the pulse amplitude, or as the current before charging is terminated.

As shown in FIGS. 1 to 4, a battery pack comprises secondary cells 10 and 12. They can be obtained from any source, such as Wilson Greatbatch Limited. The cells are connected to each other either in parallel (FIG. 2) or in series (FIG. 3) to power electronics 14. This provides the respective battery packs 16A and 16B. Such battery packs 16A, 16B are useful for powering a medical device 18 implanted into a human body H.

The following examples describe the manner and process of the present invention, and they set forth the best mode contemplated by the inventors of carrying out the invention, but they are not to be construed as limiting.

EXAMPLE I

A battery pack was assembled using an off the shelf battery supervisor from Benchmarq Microelectronics. The BQ2158T supervisor IC was trimmed with individual cell voltage limits of 2.5 v and 4.25 v, respectively. The battery pack contained two Wilson Greatbatch Limited Li-ion D (model no. 10298) cells, designated cells A1 and A2. These cells comprise a graphite anode material coupled to a lithium cobalt oxide cathode active material activated with an electrolyte of 1 M $LiAsF_6$ dissolved in a 30:70, by volume, mixture of ethylene carbonate and dimethyl carbonate.

The discharge capacity of these cells was measured on the third cycle during formation and determined to be 4367.7 mAh for both of them. Furthermore, the direct current resistance of the cells was measured during the third charge cycle and found to be 0.080 Ω and 0.110 Ω, respectively. These resistance measurements were taken during the constant voltage portion of the charge regime, and ten seconds after the charge voltage and current had been removed. The difference in voltage with and without charge current applied was divided by the current cutoff limit.

The battery pack was then cycled between an upper voltage limit of 8.1 V and a lower limit of 6 V. A constant charge rated to one fifth of the single cell capacity was used, with a charge current cutoff limit of approximately one tenth of the constant charge current. Individual cell voltages were measured every 25 cycles, in both the charged and discharged state. The voltage on the cells was observed to diverge with cycling. By cycle 215, the cell with the higher resistance had risen to 4.17 V, whereas the less resistive cell was reaching only 3.99 V. Beginning at cycle 220, the voltage of each cell within the pack was independently monitored continuously for five cycles. It was observed that cell 2 was reaching both a higher voltage on charge and a lower voltage on discharge than cell 1. The difference between the two cells was between 0.150 V and 0.200 V. By cycle 230, the pack discharge capacity had degraded to 67.5% of its initial value. Further, by cycle 330, the pack discharge capacity had degraded to 14.9% of its initial value.

EXAMPLE II

A battery pack was assembled in a similar manner as described in Example I. The cells in this example, however, were designated B1 and B2. The discharge capacity of these cells was measured on the third cycle during formation and found to be about 4458.9 mAh for cell B1 and 4175.3 mAh for cell B2. Furthermore, the direct current resistance of the cells was measured during the third charge cycle of formation to be 0.111 Ω and 0.124 Ω, respectively. These resistances were measured during the constant voltage portion of the charge regime, and ten seconds after the charge voltage and current had been removed. The difference in voltage with and without charge current applied was divided by the current cutoff limit.

The battery pack was then cycled between an upper voltage limit of 8.1 V and a lower limit of 6 V. A constant charge rated to one fifth of the single cell capacity was used, with a charge current cutoff limit of approximately one tenth of the constant charge current. Individual cell voltages were measured every 25 cycles, in both the charged and discharged state. The voltage on each of the cells was observed to remain close during cycling. At cycle 215, the difference in voltage between the two cells was only 0.03 V, compared to the difference of 0.18 V for cells 1A and 1B of Example I. By cycle 230, the pack had retained 80.1% of its initial discharge capacity. Further, by cycle 330, the pack in Example II had retained 63.6% of its initial capacity.

Table 1 summarizes the initial capacities and direct resistance of the cells A1 and A2 of Example I and cells B1 and B2 of Example II. This table also shows capacity retention of the respective packs at cycle 330.

TABLE 1

| Pack | Cell | Cycle 3 Capacity | Direct Current Resistance | Cycle 330 Retention |
|---|---|---|---|---|
| A | A1 | 4367.7 | 0.080 | 14.9 |
| A | A2 | 4367.7 | 0.110 | |
| B | B1 | 4458.9 | 0.111 | 63.6 |
| B | B2 | 4175.3 | 0.124 | |

Figure 1:
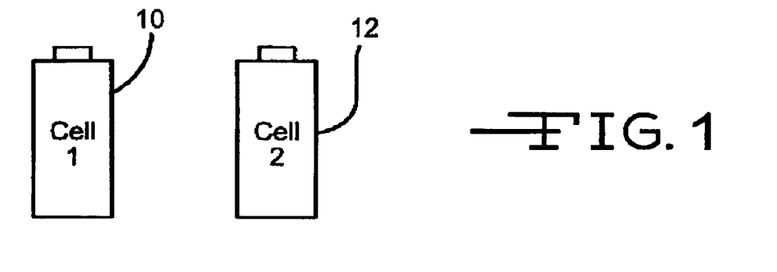
FIG. 1 is a schematic representation of two secondary cells 10 and 12 according to the present invention.
Figure 2:
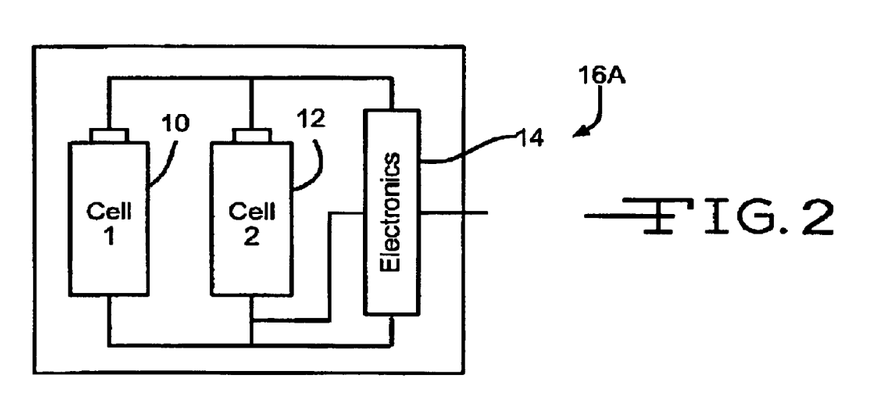
FIG. 2 is a schematic representation of the cells 10, 12 connected in parallel and powering electronics 14 for a battery pack 16A.
Figure 3:
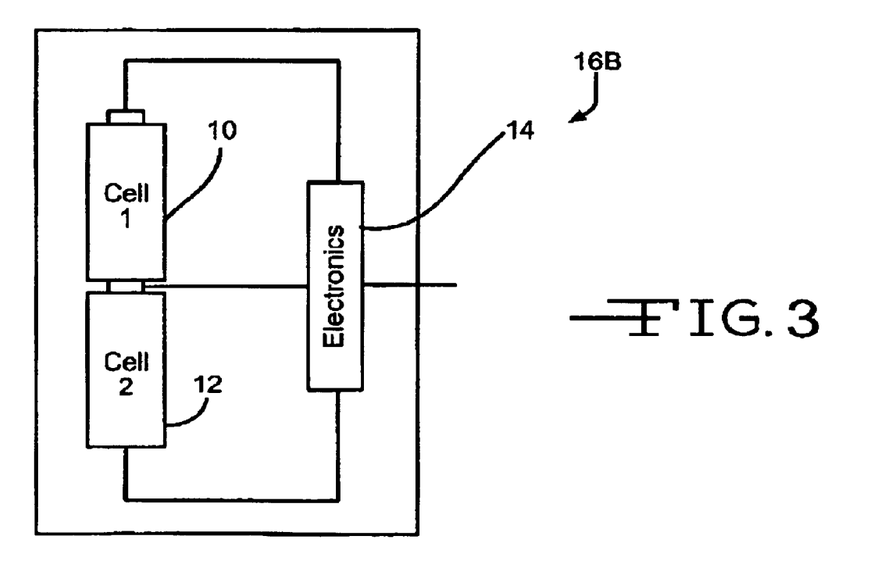
FIG. 3 is a schematic representation of the cells 10, 12 connected in series and powering electronics 14 for a battery pack 16B.
Figure 4:
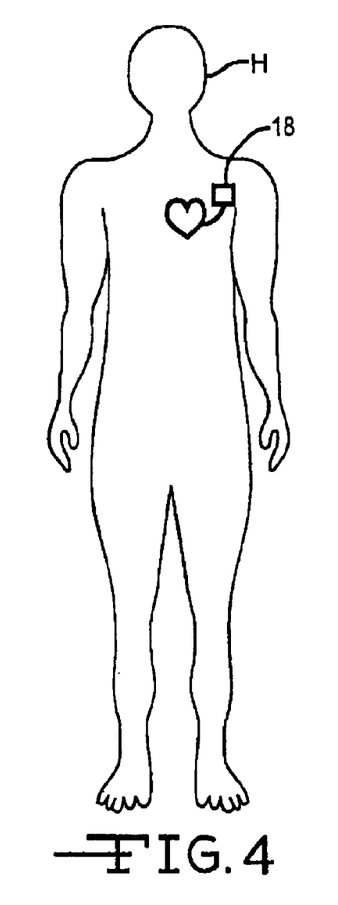
FIG. 4 is a schematic view of a medical device 18 implanted in a human H and powered by one of the battery packs of either FIG. 2 or 3.
Figure 5:
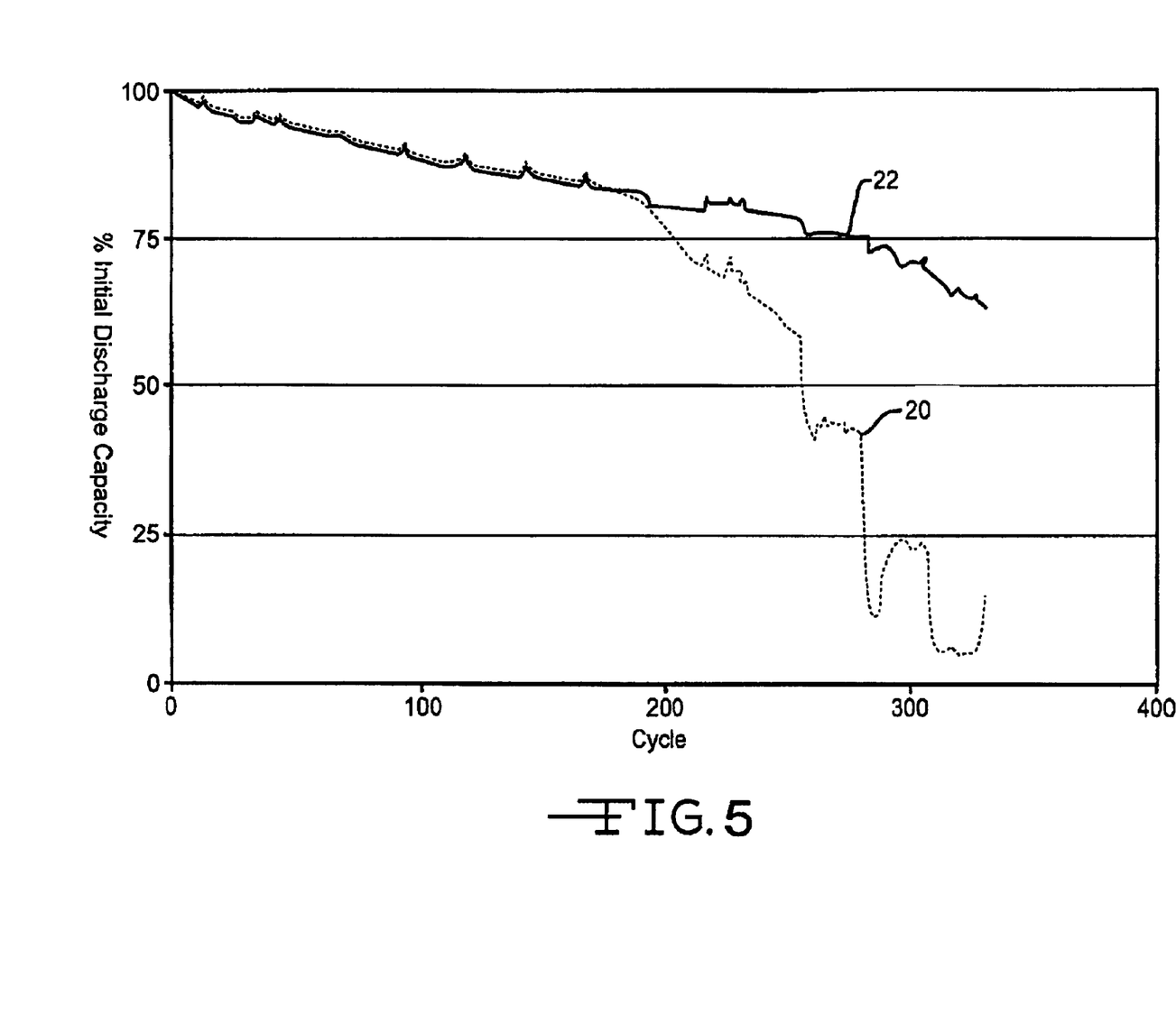
FIG. 5 shows the discharge capacity of the two packs versus cycle number, expressed as a percentage of initial capacity.

FIG. 5 is a graph of the discharge capacities of the battery packs constructed according to Examples I and II. The discharge capacities are presented as a percentage of initial capacity for the respective packs. Curve 20 designates the results for the pack of Example I while curve 22 is for the pack of Example II.

Figure 6:
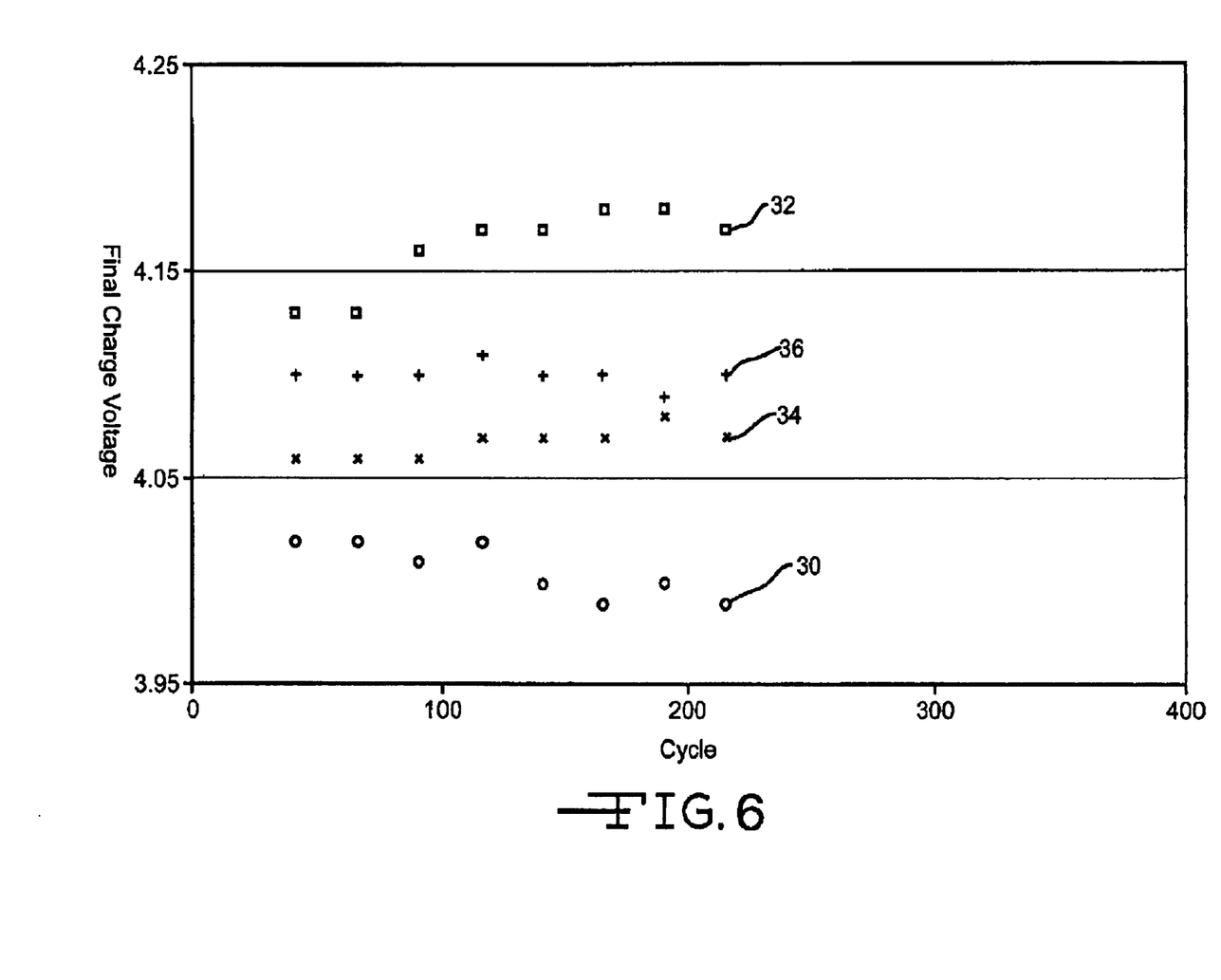
FIG. 6 shows the individual cell charge voltage sampled over 230 cycles.

FIG. 6 is a graph of the charge voltages for cells A1 (curve 30), A2 (curve 32, (curve 34) and B2 (curve 36). From this presentation it is seen that the differential charge voltages of the present invention battery pack described in Example II is much narrower than that of the battery pack in Example I.

The results from the experiments of Examples I and II indicate that for a battery pack according to the present invention, the at least two cells need to have their internal resistances to a direct charge current substantially matched to each other. Further, the discharge capacities of the at least two cells need to substantially match. This means that the internal resistance and the discharge capacities of the cells is with about 15% of each other, and preferably within about 10% of each other.

It is appreciated that various modifications to the inventive concepts described herein may be apparent to those of ordinary skill in the art without departing from the spirit and scope of the present invention as defined by the appended claims.

What is claimed is:

1. A battery pack having at least a first and a second secondary cells matched to each other, comprising
    a) a first secondary cell of a first discharge capacity and a first internal resistance to a direct charge current;
    b) a second secondary cell of a second discharge capacity and a second internal resistance to the direct charge current; and
    c) wherein the internal resistances of the first and second secondary cells are calculable by measuring their respective charging voltages and charging currents, then dividing the change in cell voltage by the charging current, and wherein at least one of the internal resistance and the discharge capacity of both the first and second secondary cells is determined to be within about 15% of the other before the first and second secondary cells are matched to each other and then connected to electronics to provide the battery pack.

2. The battery pack of claim 1 useful for powering an implantable medical device.

3. The battery pack of claim 1 wherein the measurement of the first and second internal resistances occurs at about 37° C.

4. The battery pack of claim 1 wherein the change in voltage for the first secondary cell is characterized as having been measured by pulse discharging the first secondary cell.

5. The battery pack of claim 1 wherein the change in voltage for the first secondary cell is characterized as having been measured by removing a charge current from the cell.

6. The battery pack of claim 1 wherein the change in voltage of the first secondary cell is characterized as having been measured by pulse charging the cell.

7. The battery pack of claim 1 wherein at least one of the first and second secondary cells is a lithium ion cell.

8. The battery pack of claim 1 wherein the first internal resistance is characterized as having been measured when the first secondary cell was at a full state of charge.

9. The battery pack of claim 1 wherein the second internal resistance is characterized as having been measured when the second secondary cell was at a full state of charge.

10. The battery pack of claim 1 wherein the first secondary cell is interconnected in series with the second secondary cell.

11. The battery pack of claim 1 wherein the first secondary cell is interconnected in parallel with the second secondary cell.

12. A method for providing a battery pack comprising at least a first and a second secondary cells matched to each other, comprising the steps of:

a) measuring at least one of a first discharge capacity and a first internal resistance to a direct charge current for the first secondary cell, wherein the first internal resistance is determined by measuring a change in voltage and a change in current to the direct charge current and dividing the voltage change by the current change;

b) measuring at least one of a second discharge capacity and a second internal resistance to the direct charge current for the second secondary cell, wherein the second internal resistance is determined by measuring a change in voltage and a change in current to the direct charge current and dividing the voltage change by the current change;

c) matching the first secondary cell to the second secondary cell based on them having at least one of an internal resistance to the direct charge current and a discharge capacity that is within about 25% of each other; and d) connecting the first and second secondary cells to an electronics to provide the battery pack.

13. The method of claim 12 including using the battery pack to power implantable medical device.

14. The method of claim 12 including measuring the first and second internal resistances at about 37° C.

15. The method of claim 12 including pulse discharging the first secondary cell to observe its change in voltage.

16. The method of claim 12 including removing the charge current from the first secondary cell to observe its change in voltage from a first voltage just before the current is removed to a second voltage after the charge current has been removed.

17. The method of claim 12 including measuring the change in voltage of the first secondary cell by pulse charging the cell.

18. The method of claim 12 wherein at least one of the first and second secondary cells is of a lithium ion chemistry.

19. The method of claim 12 including measuring the first internal resistance when the first secondary cell is at a full state of charge.

20. The method of claim 12 including measuring the second internal resistance when the second secondary cell is at a full state of charge.

21. The method of claim 12 including connecting the first secondary cell in series with the second secondary cell.

22. The method of claim 12 including connecting the first secondary cell in parallel with the second secondary cell.

* * * * *

UNITED STATES PATENT AND TRADEMARK OFFICE
CERTIFICATE OF CORRECTION

PATENT NO.    : 6,801,016 B2
DATED         : October 5, 2005
INVENTOR(S)   : Steven Davis et al.

It is certified that error appears in the above-identified patent and that said Letters Patent is hereby corrected as shown below:

Column 8,
Line 16, "A2(curve 32, (curve 34)" should read -- A2 (curve 32), B1 (curve 34) --;
Line 25, "watched" should read -- matched --;

Column 10,
Line 4, "25%" should read -- 15% -- ; and
Line 8, "power implantable" should read -- power an implantable --.

Signed and Sealed this

Nineteenth Day of July, 2005

JON W. DUDAS
*Director of the United States Patent and Trademark Office*